Sept. 18, 1962  A. E. COMSTOCK  3,054,550
FOOD CONTAINER AND METHOD OF MAKING
Filed Jan. 4, 1960  4 Sheets-Sheet 1
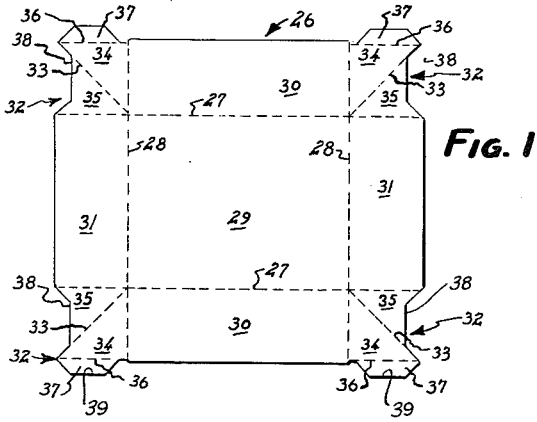
FIG. 1
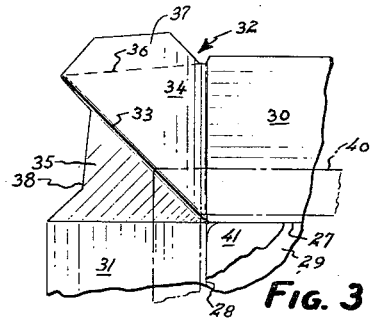
FIG. 3
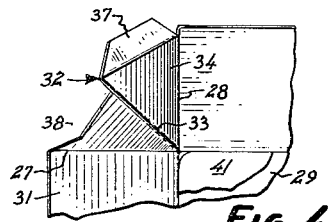
FIG. 4
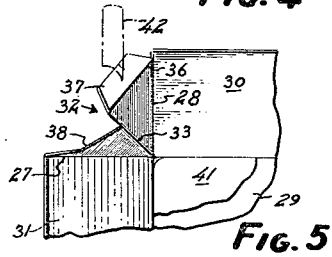
FIG. 5
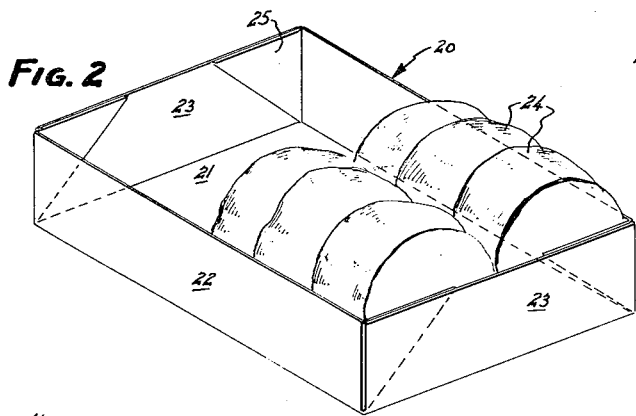
FIG. 2
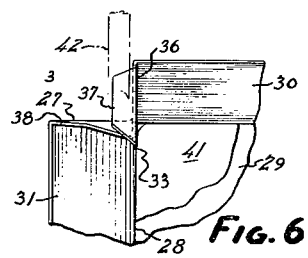
FIG. 6
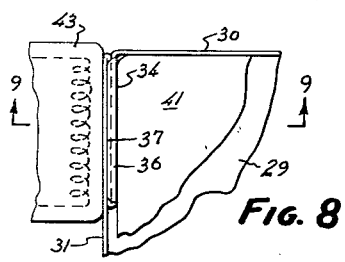
FIG. 8
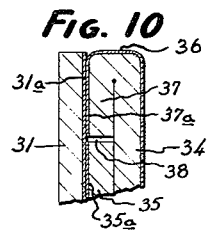
FIG. 10
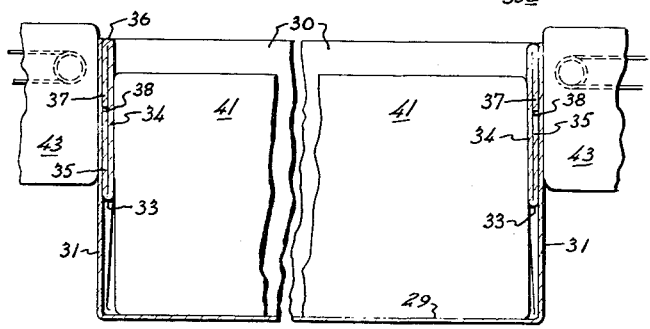
FIG. 9
FIG. 7
INVENTOR.
ALFRED E. COMSTOCK
BY
ATTORNEY Sept. 18, 1962 A. E. COMSTOCK 3,054,550
FOOD CONTAINER AND METHOD OF MAKING
Filed Jan. 4, 1960 4 Sheets-Sheet 2
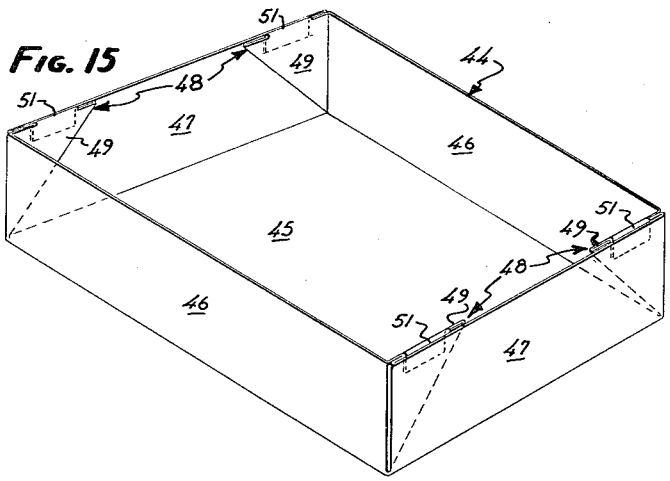
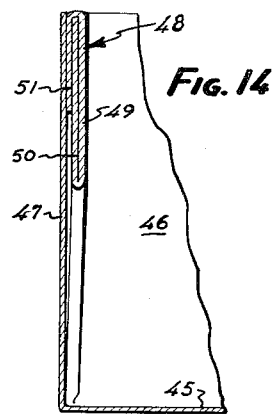
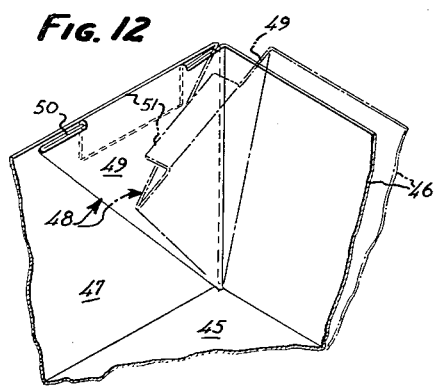
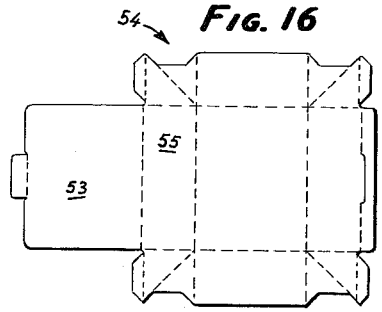
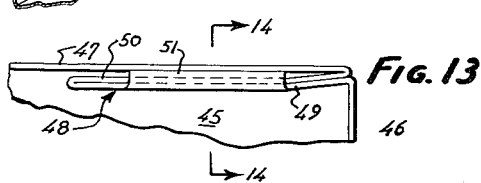
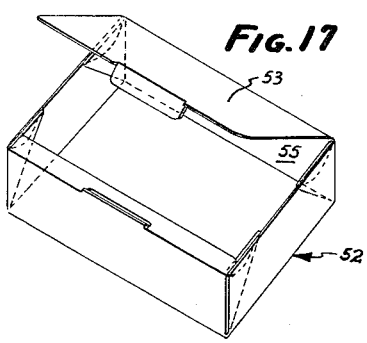
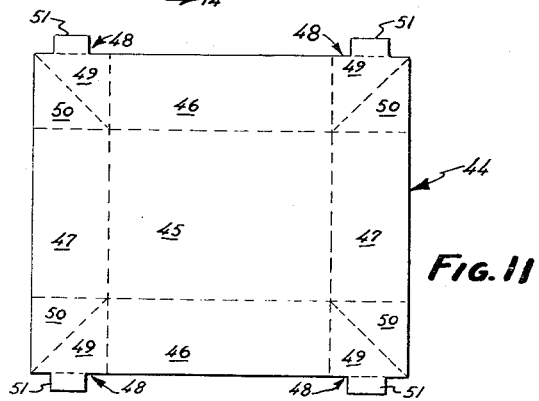
INVENTOR.
ALFRED E. COMSTOCK
BY
ATTORNEY Sept. 18, 1962    A. E. COMSTOCK    3,054,550
FOOD CONTAINER AND METHOD OF MAKING
Filed Jan. 4, 1960    4 Sheets-Sheet 3

INVENTOR.
ALFRED E. COMSTOCK
BY
ATTORNEY

Sept. 18, 1962    A. E. COMSTOCK    3,054,550
FOOD CONTAINER AND METHOD OF MAKING
Filed Jan. 4, 1960    4 Sheets-Sheet 4

INVENTOR.
ALFRED E. COMSTOCK
BY
ATTORNEY

United States Patent Office 3,054,550
Patented Sept. 18, 1962

3,054,550
FOOD CONTAINER AND METHOD OF MAKING
Alfred E. Comstock, 20 Bayview Road, Belvedere, Calif.
Filed Jan. 4, 1960, Ser. No. 1,399
11 Claims. (Cl. 229—31)

This invention relates to improvements in containers and their manufacture. More particularly, it relates to a novel folding box blank and to the assembly and bonding of that blank into a container.

This application is a continuation-in-part of my copending application Serial No. 804,736, filed April 7, 1959, now abandoned.

The packaging industry has long struggled with the problem of providing a strong, durable, foldable box that combines structural integrity with low unit cost and relative ease of rapid assembly. The present invention solves that problem.

Even with the indifferent and faulty expedients heretofore known, foldable boxes are used in large numbers for the storage, handling, and display of a wide variety of products, and perhaps the greatest demand for this type of container comes from the food industry. Here, folding cardboard as well as folded boxes using fibrous pulp products, or those made of thin wood, are used for various foods such as meats, fruits, berries, bakery products, prepared dishes, and frozen foods. But the food containers presently in use have proved to be unsatisfactory, for a number of reasons.

For one thing, moisture, food acids, grease, and other materials normally occurring in foods, have tended to cause deterioration of the fibrous types of box materials, including cardboard. The boxes have absorbed food juices, which structurally weakened the boxes and made them difficult to handle. Absorption of the food juices by the containers also caused the food to dry out and lose flavor. It was found that the absorption problem could be reduced by the use of surface-treated and laminated cardboard sheets. However, the problem remained of finding a box-blank configuration which could be cut and scored from a single piece of laminated or surface-treated material, and then assembled rapidly, by a reasonably simple process, at low cost, to form a strong, leak-proof container.

A major hurdle which heretofore prevented the solution of this problem was the difficulty in making a corner connection which would hold the box securely in shape and be absolutely leak-proof. The corner connections must have sufficient strength to stay together under pressure incurred during normal handling conditions and they should not weaken upon exposure to moisture in the contents or to foreign substances.

Foldable box-blanks of the prior art heretofore have included various die-cut interlocking corner members. This type of corner had several serious disadvantages, including the fact that close tolerances had to be maintained in cutting and printing the connecting elements, to achieve proper register of the printing on the outside of the assembled box. Also, the locking elements tended to tear, or at least weaken, when subjected to stress and moisture. No prior-art corner connection has afforded sufficient rigidity to give adequate protection to the contents of the box. For example, foldable boxes using interlocking corner members had weak side-members that offered little resistance to side pressure. Thus, relatively fragile contents, such as bakery goods, often became crushed during the normal handling process.

To overcome the serious disadvantages of the aforementioned interlocking corner connection, the concept was evolved of providing a container having corner connections integrally connected with the bottom and side portions and completely free of slits or holes. It was recognized that such a container would be practically leak-proof; no outside moisture could enter and valuable food juices could not escape from the container. However, prior attempts to devise a folded, integral-corner connection met with failure. No adequate means was evolved for locking or binding the connection, once it was folded, to provide a rigid, durable box. To fulfill the large demand for boxes of this type, it was essential that the boxes be adaptable for assembly at a high rate of production by automatic machines, and the prior art failed to come up with such a box. Additional problems in providing an integral corner connection arose with regard to the method of folding the box-blank and with the reduction in the thickness of material at the corners of the finished boxes.

It is therefore an object of the present invention to provide a solution to the aforementioned problems; to fulfill the long-felt need in the packaging industry for a strong, durable, leak-proof and inexpensive container. I have provided a box-blank having a unique shape which enables the blank to be assembled at any desired rate of production, either by simple hand methods or by automatic machines.

Another object of the present invention is to provide a novel corner connection for a tray-like container formed on and foldable from a box-blank to lie adjacent the inner surface of an end-section of the container and provide no more than three thicknesses of material at this point.

Another object of my invention is to provide a box-blank having a unique corner configuration which is foldable into a leak-proof corner connection adapted to be joined with the inner surface of an end-section of the container.

Another object of my invention is to provide a novel method of making a tray-like food container which is adaptable to either a simple hand operation or to a machine of varied complexities, depending on the desired rate of production.

Another object of my invention is to provide a box-blank wherein an adhesive material is applied only to one surface and the blank is folded so that portions of corner connections engage and seal to form a rigid container.

More specifically, an object of the present invention is to provide a food container from a pre-cut box-blank of non-absorbent material having a thermoplastic coating on one surface thereof. My new box-blank has bottom and side members and novel corner connections that provide a strong, rigid, leak-proof food tray, the corner connections being formed by folding the corner portions of the blank against the inside ends of the container and applying pressure and heat thereto.

Another object of my invention is to provide a box-blank that can be formed from sheets in large numbers with a minimum number of cutouts. When cutouts occur in forming the blank, not only do they amount to a sizeable amount of waste, but they also require additional steps to remove them during the manufacture of the blanks and before the boxes are ready for assembly. I have accomplished this objective in a modified form of my invention by forming the blank into a substantially rectangular shape whose length and width are defined by the outer edges of the integral side and end members on the blank. The web-corners lie completely within the rectangle, yet can be cut and folded so that surfaces having a layer of heat-sealing material can be engaged to form full-wall corner connections on a leak-proof container.

Other objects and advantages of the present invention will be apparent from the following description and from the drawings, in which:

FIG. 1 is a plan view of a box-blank embodying the principles of the invention.

FIG. 2 is an enlarged view in perspective of a completed container formed from the box-blank of FIG. 1 and partially filled with a food product, such as bakery goods.

FIGS. 3 to 8 are further enlarged fragmentary plan views of one corner of the box-blank of FIG. 1, shown at successive stages during the process of making the container of FIG. 2.

FIG. 3 shows the corner just starting to fold.

FIG. 4 shows the corner being folded progressively inward, with the side and end wall portions of the blank beginning to shape upwardly.

FIG. 5 shows a finger element engaging a tab-member and commencing to bend the tab downwardly.

FIG. 6 shows the folding process continuing.

FIG. 7 shows the tab-member almost completely bent over and the end-wall of the container almost adjacent the corner connection.

FIG. 8 schematically shows heat and pressure being applied to seal the corner connection to the end-wall.

FIG. 9 is a view in elevation and in section, taken through the line 9—9 of FIG. 7, with the container broken in the middle in order to conserve space.

FIG. 10 is an enlarged fragmentary view in section of the container showing in detail the thermoplastic surfaces which engage and weld to form the corner connection.

FIG. 11 is a plan view of a modified form of box-blank having tab-members but no cut-out sections.

FIG. 12 is a fragmentary greatly-enlarged view in perspective of one corner at an intermediate step of the folding process of the modified form of box-blank.

FIG. 13 is a fragmentary plan view of the corner of FIG. 12, shown folded against the side-wall.

FIG. 14 is a fragmentary view in elevation and in section of the completed corner, taken along the line 14—14 of FIG. 13.

FIG. 15 is a view in perspective of a completed food tray constructed according to the modified form of invention of FIGS. 11–14. The scale is intermediate those of FIGS. 11 and 12.

FIG. 16 is a plan view of a box-blank embodying the principles of the invention and including a top portion.

FIG. 17 is a view in perspective showing the blank of FIG. 15 erected into a box with the top member about halfway open.

Figure 18:
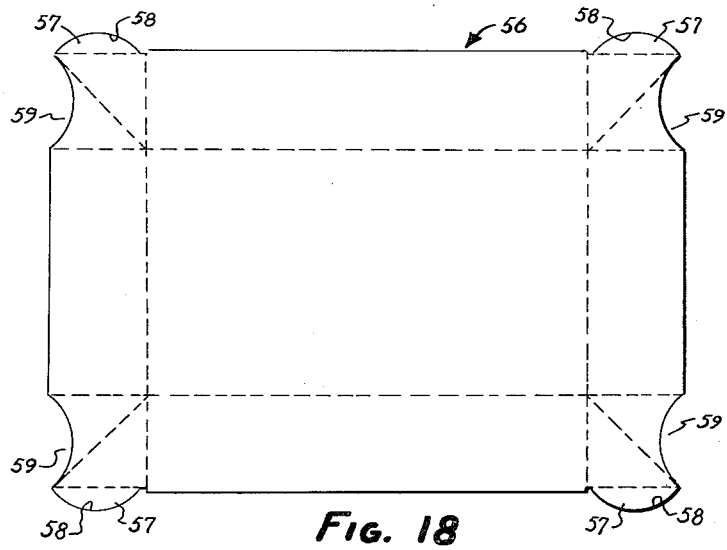

FIG. 18 is a plan view of a box-blank embodying the principles of the invention and using curved tabs and cutouts.

Figure 19:
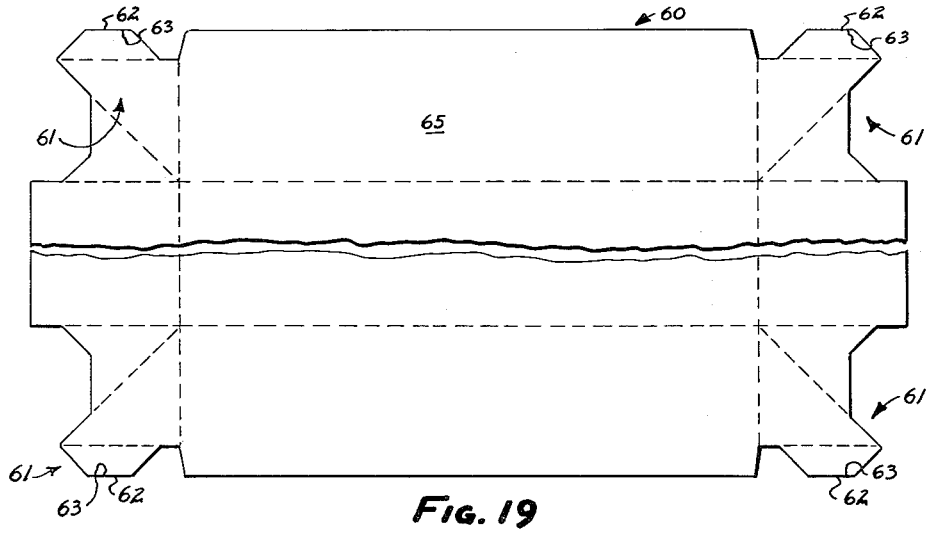

FIG. 19 is a plan view of a box-blank showing indented corner connections of reduced size which allow the blank to be cut from a rectangular piece of material with a minimum of waste.

Figure 20:
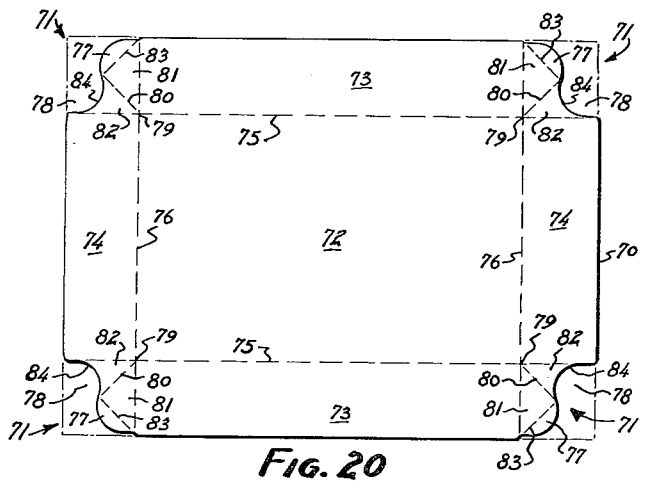

FIG. 20 is a plan view of a modified form of box-blank having curved tab-members and cutouts which are specially shaped in relation to a diagonal foldline across each corner of the blank.

Figure 21:
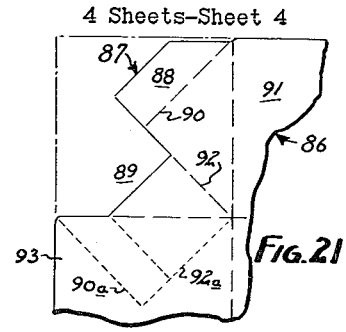

FIG. 21 is an enlarged fragmentary plan view of a corner section of another modified form of box-blank having trapezoidal tab-members and cutouts also formed with special relation to a diagonal foldline across the corner of the blank.

Figure 22:
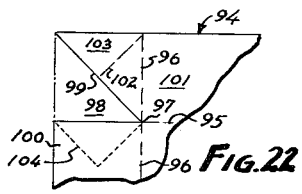

FIG. 22 is an enlarged fragmentary plan view of a corner section of another modified form of box-blank having triangular tab-members foldable along a diagonal line across the corner of the blank.

Figure 23:
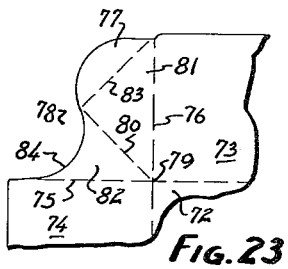

FIG. 23 is an enlarged fragmentary plan view of one corner of the box-blank shown in FIG. 20.

Figure 24:
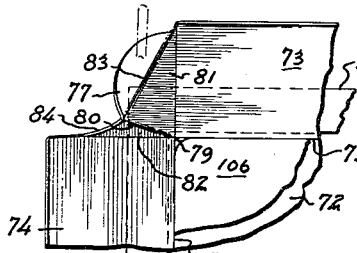
Figure 25:
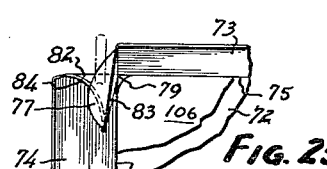
Figure 26:
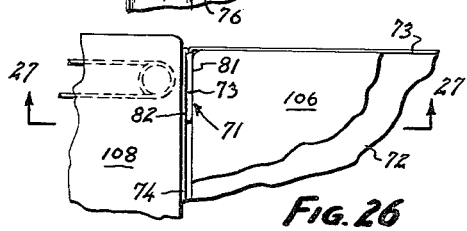

FIGS. 24 to 26 are further enlarged fragmentary plan views of one corner of the blank of FIG. 20, shown at successive stages during the process of forming a container from the blank.

FIG. 24 shows the corner just starting to fold.

FIG. 25 shows the corner being folded progressively inward, with the side and end-wall portions of the blank beginning to shape upwardly and the tab being bent downwardly.

FIG. 26 schematically shows heat and pressure being applied to seal the corner connection to the end-wall.

Figure 27:
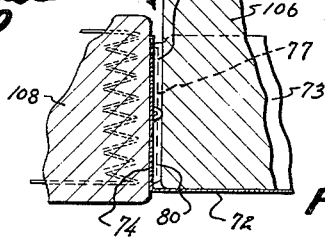

FIG. 27 is a fragmentary view in elevation and in section taken through the line 27—27 of FIG. 26.

Figure 28:
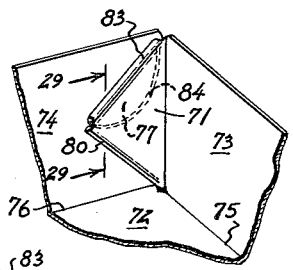

FIG. 28 is a fragmentary view in perspective showing the corner connection of FIGS. 23 to 27 as it appears from inside the completed container.

Figure 29:
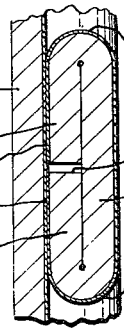

FIG. 29 is an enlarged fragmentary view in section taken through the line 29—29 of FIG. 28. The thicknesses of the laminated materials have been exaggerated.

Figure 30:
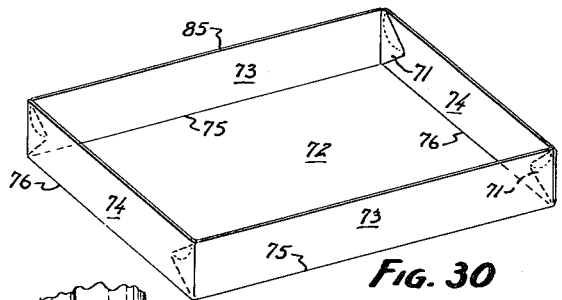

FIG. 30 is a view in perspective of a completed container formed from the box-blank shown in FIG. 20.

Many different types and shapes of containers may be made by using the principles of this invention. These principles are illustrated by a few examples, one of which, as shown in FIGS. 1–9, is the making of an "open-tray" type of food container 20, used extensively for packaging and displaying meats and bakery products. Trays of this type may be square or rectangular, and have a flat bottom 21 with substantially vertical sides 22 and ends 23 to retain the food 24 in its shape, keep moisture out, and prevent the escape of any valuable juices. In the tray 20 the sides 22 and ends 23 are held together by folded corner members 25. The corner members 25 of the present invention provide a strong and durable connection between the side and end-members 22 and 23, and are devised to enable rapid assembly of the containers 20 by automatic machines.

Various forms of box-blanks are shown in FIGS. 1–30 and will be described throughout the following detailed specification, each of the forms having certain distinctive characteristics but all of them incorporating certain novel features within the scope of the present invention.

The container 20 may be constructed from a box-blank 26, which is cut and scored in a unique manner, as typically illustrated in FIG. 1. The blank 26, whose shape and foldlines comprise an important part of my invention, is preferably cut from nonabsorbent material such as a laminate comprising a relatively stiff cardboard backing layer and a surface layer of moisture-resistant material. However, where moisture is not a problem and the containers are to be used with dry goods, any suitable cardboard will do. The cardboard may be bonded to other materials, such as a thin layer of metallic foil, to add more desirable characteristics. On the inner surface of the container, corresponding to the upper surface of the box-blank 26, I prefer to bond a heat-responsive or thermoplastic coating, preferably a polymer resin such as vinyl, acrylate, or styrene resin. Actually this coating need not cover the bottom wall 21, but for convenience in application it usually is applied to the entire upper surface of the blank.

The blanks may be produced by feeding material in roll or sheet form into a die-cutting press which has knives and scoring bars in the desired configuration. The die-cutting press rapidly stamps out the box-blanks 26, cut to the desired shape and impressed with folding indentations. It is possible, of course, to make the blanks 26 manually.

The novel box-blank 26 of FIG. 1 is generally rectangular and has a parallel pair of folding indentations or scorelines 27 substantially parallel to its side edges and a similar pair of indentations 28 parallel to the end edges. The scorelines 27 are perpendicular to the scorelines 28 and they define a rectangular center portion 29 which subsequently becomes the box-bottom 21. The scoring-lines 27 and 28 extend to the edges of the box-blank 26 to define elongated side-wall and end-wall sections 30 and 31 adjacent the inner rectangle 29, and web-corner portions 32.

The web-corner portions 32 are scored diagonally along a line 33 that extends from the corners of the inner rectangle 29 to the corner of the box-blank 26. The diagonal scoreline 33 divides the corner portion 32 into two adjacent generally triangular sections 34 and 35, each section 34 being attached to a side-wall section 30 and each section 35 being attached to an end-wall section 31. Each generally triangular section 34 is integrally provided, along a scoreline 36, with a tab-member 37 which extends beyond the edge of the adjoining side-member 30. The tab-member 37 may be of any suitable shape, although I prefer to form it in the shape of a trapezoid having its outer edge 39 generally parallel to scoreline 36 as shown in FIG. 1. In the adjacent generally triangular section 35 is a cutout section 38 substantially equal in area and shape to the tab-member 37 of the adjoining section 34.

To form an absolutely level corner on a set-up box, I prefer to provide a small notch between the tab-member 37 and side wall section 30 (FIG. 1). It is also advantageous to lower scoreline 36 slightly closer to scoreline 27 than the outer edge of side-wall section 30. These refinements serve to allow for the folding of the corner connections 25 so that no portion thereof will protrude above the edge of the completed container 20.

When forming the blank 26, the scorelines 27 and 28 are creased to facilitate inward folding of the side and end-members 30 and 31. The scorelines 33 and 36 are generally creased in the same direction as lines 27 and 28 for production expediency, although they must fold outwardly in the opposite direction during the set-up of the container. To permit easier bending of the corner portions 32 along the lines 33 and of the tab-members 37 along the lines 36, I may therefore use perforated cutting at these points when forming the blank, particularly on small boxes where bending moments must be small.

To best illustrate the typical formation of a box-blank 26 into the container 20, I have shown one corner in various stages of assembly in FIGS. 3 to 8, each corner being made identically. The blank 26 may be set up by hand or pressed into shape by a die. As the folding operation commences, as shown in FIG. 3, the box-blank 26 may be positioned above a die-frame 40 and downward pressure applied to the bottom section 29 by a die 41, moving the box-blank 26 into the die-frame 40. The corner portions 32 commence to buckle along diagonal scorelines 33 and the side-wall and end-wall members 30 and 31 begin to turn upward, as shown in FIGS. 3 and 4. Inward pressure along the diagonal 33 of corner members 32 increases as the blank 26 is progressively pushed into the female die-frame 40, and the end-members 31 and side-members 30 progressively bend upwardly.

The next step is to bend the tabs 37 outwardly and down, as shown in FIGS. 5 and 6. Pressure may be applied to the tab-member 37 by a finger 42 to bend the tab outwardly and fold it a complete 180° against its adjacent triangular section 34. The straight outer edge 39 of tab 37 provides a straight-edge contact area for finger 42 to engage tab 37, which eliminates the need for critical adjustments when the containers are set up rapidly by a machine having mechanically controlled fingers 42.

The upward folding of the end-walls 31 may precede slightly the upward folding of the side-walls 30, so that the corner members 32 are brought to lie against the inner surface of end-members 31 (FIG. 7).

As previously discussed, the box-blank 26 is preferably covered, in its construction, with a thin layer of thermoplastic resin. With the end-members 31 completely folded into the desired position, pressure and heat are applied to the thermoplastically-coated end-members 31, as shown in FIGS. 8 and 9, by a suitable heated pressure-element 43, to effect the welding of the web-corner members 32. In order for a surface treated with a layer of thermoplastic resin to weld to a second surface, the second surface must have a similar coating of thermoplastic resin. As seen in FIG. 10, I have accomplished the necessary structure to seal the corner, because the corner portion 35 is coated with thermoplastic laminate 35a and so is the end-wall portion 31 coated with a similar layer 31a to which laminate 35a is sealed. The tab 37 also is coated with layer 37a and when folded over 180° it engages with and is sealed to the end-wall layer 31a, thereby closing the corner portion 34 tightly against the adjacent corner portion 35, even though they are not sealed together, since their abutting surfaces are not coated. As the tab-member 37 is bent over, and the corner-connection 32 is pressed against the end-member 31, the thermoplastically-coated side of the tab-member 37 fits within the cutout-section 38 to avoid unnecessary thickness at this point. Thus the invention employs a welded-corner connection to provide a strong, leak-proof container.

In the modified form of the invention shown in FIGS. 11–15, there is no cutout corresponding to the cutout-section 38 of the web-corner 32 of the box-blank 26 in FIG. 1. In FIGS. 11–15, the modified form of blank 44 has a bottom-section 45, side-members 46, and end-members 47. Adjoining the side and end-members 46 and 47 are corner-connections 48 which are scored diagonally to form triangular-sections 49 and 50. A tab-member 51 is attached along the triangular-section 49. In this embodiment, the tab-member 51 folds over the top of the adjacent triangular-section 50 as illustrated in FIG. 11, to engage the end-member 47 of the box-blank 44. While the web-corner 48 forms an effective seal, it is not as desirable as the preferred embodiment using the cutout-section 38 of the box-blank 26, since it makes a somewhat bulkier end-connection and also does not lend itself as readily to rapid production when using machinery for assembling the boxes.

FIGS. 13 and 14 illustrate that, in boxes having a substantial thickness of material in the blank, the additional thickness at the corner sections resulting from the box-blank 44 is not as desirable as the thinner corners of the box-blank 26 shown in FIG. 1. The tab-members 51 are shown to be rectangular in shape on box-blank 44, rather than the trapezoidal sections as on blank 26, to illustrate the fact that the tabs may be of any suitable shape desired. In the preferred form using cutout sections, the cutout is preferably shaped similarly to the tab, but this is not necessary as long as the cutout area is larger than the tab and shaped to accommodate the tab.

While all of the foregoing description has been directed to a tray-type box, the principles of my invention also can be utilized in boxes 52 having folding tops 53 with the standard locking members. Shown in FIG. 16 is a box-blank 54 using the principles of my invention and in particular the corner-connections of box-blank 26, but with a top-member 53 extending from the edge of a side-member 55 and scored so that it may be bent in the desired position, as further shown in FIG. 17.

Still other variations and refinements in my novel box-blank may be made within the scope of the present invention. In FIG. 18, another box-blank 56 is shown having tab-members 57 with a curved outer edge 58 and cutout sections 59 of similar shape.

So far, I have described variations of the novel foldover tab and cutout combination wherein each tab-member folds along a scoreline substantially coincident with the outer edge of the adjoining side-member of the box-blank. With this type of web-corner, as shown in FIG. 1, the tab-members 37 must extend from their scorelines 36 beyond the limits of the side-members 30.

One way of overcoming this problem of having to extend the tabs outwardly from the edges of the box-blank is to provide a box-blank 60 as illustrated in FIG. 19. Here, the corner-connection 61, utilizing the preferred trapezoidal shape on tabs 62, is reduced in size so that the outer edges 63 of tabs 62 are coincident with the outer edges 64 of side-members 65. This permits the box-blanks 60 to be made from a rectangular sheet of laminated stock, thereby avoiding waste of material due to allowance for the normally extending tabs. The set-up box formed from blank 60 is almost as strong as the box 20 shown in FIG. 2, although not leak-proof completely all the way to its top. However, in many cases, the full depth integral connection is not absolutely necessary as long as the corner-connection 57 is large enough to assure a strong joint.

This leakage problem, too, can be solved by this invention. FIGS. 20 to 30 show modified forms of the invention having a leak-proof structure all the way to the top, while also having a blank free from tabs projecting beyond the rectangle. One example of my modified web-corner is shown on the box-blank 70 of FIG. 20. Using the same novel fold-over tab and cutout principle, the modified web-corner members 71 lie completely within the borders of a rectangle having the same length and width as the completed box-blank 70, and yet these web-corners 71 provide a completely leak-proof, full-sided container.

The blank 70 is formed from the same laminated material, having a layer of heat-sensitive thermoplastic resin on its upper surface and cut to a rectangular shape, with a main center-section 72 having adjoining side-members 73 and end-members 74 which are preferably of equal width. The novel web-corners 71 are located between the side and end-members 73 and 74, which are formed by horizontal and vertical scorelines 75 and 76, respectively. One important distinctive feature of the modified web-corner members 71 is that they are provided with fold-over tab-members 77 which, instead of folding on a line parallel to the edge of an adjoining side-member, as do the tabs 37 in FIG. 1, fold along a diagonal line 78 connecting the outer edges of the adjacent side and end-members 73 and 74.

The diagonal line 78 extends across each corner of the box-blank 70, preferably between the end-points of the horizontal and vertical scorelines 75 and 76 and, in any event, near or at the edge of the blank 70 and substantially equidistant from the intersection 79 of the scorelines 75 and 76. From each intersection 79, which also is a corner of the center-portion 72, a diagonal scoreline 80 is formed perpendicular to the line 78 and essentially bisecting the web-corner area and dividing it into two sections 81 and 82, which may be considered as generally triangular except for small cutout portions. The folding tab-member 77 is connected to its adjoining triangular-section 81 by means of a scoreline 83 coincident with the diagonal-line 78 and the section 81, in turn, is integrally attached by means of a vertical scoreline 76 to a side-member 73. The adjacent triangular-section 82 of each web-corner 71 has a cutout 84 having an area substantially equal in size and shape to the tab-member 77, so that when the tab 77 is folded over during the assembly of the container 85, it will fit within the cutout 84. In plan view, the tabs 77 and cutouts 84 of the box-blank 70 in FIG. 20 form an irregular edge having an S-like reverse curve running across the diagonal-line 78 which connects the outer edges of the side and end-members 73 and 74. It is obvious, of course, that the tab-member 77 and the cut-out section 84 may have their positions reversed on the triangular-sections 81 and 82, if it is desired that the web-corner 71 be folded to engage the side-member 73 rather than the end-member 74.

Other convenient shapes of diagonally folding web-corner tabs may also be employed within the scope of the present invention. For example, in FIG. 21 is shown a blank 86 having a web-corner 87 with a trapezoidal-tab 88 and a cutout 89 of similar shape. The tab 88 is foldable along a diagonal scoreline 90 from the side-member 91 and when the web-corner 87 is folded into the assembled portion along a diagonal scoreline 92, the tab 88 is bent around 180° to fit within the cutout 89, as shown by the dotted lines 90a and 92a on end-member 93.

Another form of the diagonally folding web-corner tab modification is shown on the blank 94 in FIG. 22. Here, the square-corner area, formed by the intersecting horizontal and vertical scorelines 95, 96, is essentially bisected along a diagonal extending from the intersection 97 of the scorelines 95 and 96, thus forming triangular-sections 98 and 99 adjoining the end and side-members 100 and 101, respectively The triangular-section 98 adjoining end-member 100 is completely removed to form a cutout area. A scoreline 102 is formed on triangular-section 99 extending from the outer end of vertical scoreline 96 to substantially the midpoint on the long side of triangular-section 99. The outer half of triangular-section 99 as defined by scoreline 102 then becomes a fold-over tab-member 103. Thus, when the blank 94 is assembled, the tab 103 folds over to fit within the cutout area or triangular-section 98, as shown by the dotted line 104 and, in this instance, provides the entire bonding connection between side-member 101 and member 100.

The container assembly operation for all of the diagonally-folding web-corners of FIGS. 20–22 may be performed in essentially the same manner as described with reference to the earlier modification of the invention as shown in FIGS. 3 through 7. FIGS. 23–26 illustrate the container assembly using a web-corner 71 as shown on the box-blank 70 of FIG. 20. The blank 70 may be positioned above a die-frame 105 and downward pressure applied to the bottom-section 72 by a die 106, moving the box-blank 70 into the die-frame 105. The corner-portions 71 commence to buckle along diagonal scorelines 80 and the side-wall and end-wall members 73 and 74 begin to turn upward, as shown in FIGS. 24 and 25. Inward pressure along the diagonal 80 of corner-members 71 increases as the blank 70 is progressively pushed into the female die-frame 105, and the end-members 74 and side-members 73 progressively bend upwardly. The tabs 77 are next bent outwardly and down, as shown in FIGS. 24 and 25, pressure being applied to the tab-member 77 by a finger 107 which bends the tab 77 outwardly and folds it a complete 180° against its adjacent triangular-section 81.

With each corner-member 71 folded into the desired position against end-members 74, pressure and heat then are applied in the same manner as described with the previously discussed versions of my invention shown in FIGS. 1–19. As shown in FIGS. 26 and 27, a suitable heated pressure-element 108 may be employed to effect the welding of the web-corner members 71.

In FIG. 28 I have shown the corner-connection 71 as it appears completely folded against the end-member 74. FIG. 29 is a section taken through the assembled corner-connection 71 to show that this modified form of my invention also provides a corner-construction wherein all of the connecting surfaces which engage have a layer of thermoplastic material and thus will weld together to form the container 85. The end-wall portion 74, coated with a thermoplastic layer 110, engages the triangular-section 82 on its lower side which has a similar thermoplastic layer 111. The tab 77 also is coated with a layer 112 and, when folded over 180°, engages with and is bonded to the end-wall layer 110, thereby closing the corner portion 81 tightly against the adjacent corner portion 82, even though they are not sealed together, since their abutting surfaces aer not coated. Thermoplastic layers 110, 111, and 112 are, of course, merely designations for the particular areas of one laminated layer, which may be formed on the entire upper surface of the blank 70, before the blank is cut.

All forms of the diagonally-folded web-corner modification as shown in FIGS. 20–22, when assembled provide a completed container similar to container 85 shown in FIG. 30. These box-blanks, using the modified diagonally-folding web-corner, have several advantages over the box-blank embodiments illustrated in FIGS. 1 to 18, and may thus be somewhat more desirable for particular applications. The most important feature is that a blank using the modified web-corner can be made in a simple rectangular shape with the entire web-corner, including the tab, confined completely within the borders of the blank. This eliminates the waste of material which is formed on the box-blanks 26 and 56 where the tabs extend beyond the edges of the side-walls. The box-blanks 70, 86, and 94 can therefore be produced at minimum cost with practically no waste of board material. Moreover, the cutting dies for forming the box-blanks can be of relatively simple construction and quantity production is more readily obtainable, since fewer cut-out areas are required which not only are wasteful but also require time to remove. The only cutout-waste necessary in forming the blank 70 is at the enclosed web-corner members 71.

With all modifications of my invention, the novel structure and shape of my box-blank and its method of assembly combine to provide a container having several unique features which comprise important improvements over prior-art containers. One outstanding advantage of the container of the present invention is that the corner connections are formed from web-sections which are entirely integral with the end and side-members, with no slits or perforations required to form the connections. Thus, the box is absolutely leak-proof and the problem of retaining the vital food juices has been solved. In addition, the corner connections formed in using the present invention have extremely high strength and provide a box having sides which are rigid and which resist pressure that may be applied inadvertently, and otherwise would damage the contents. Further, the boxes using my invention can be made as shallow as ½", a thickness that is not practical with the foldable boxes of the prior art, such as those having locking-tabs.

Another important advantage of my invention is that the container thus provided may easily be printed with the various multi-colored designs so highly desirable in the food packaging industry. Prior art devices which required thermoplastic coating on both sides of the box-blank to attain a corner connection could not be printed, since the thermoplastic coating resists the application of printing inks. My device provides a container which can be made of a laminated sheet which need be coated with adhesive on one side only, allowing the outside of the box to be made from any suitable cardboard lamination which can be printed easily. Also, the novel construction of my box-corner connection eliminates the printing problems of attaining proper register, which are common to the inter-locking tab-type connection.

To those skilled in the art to which this invention relates, many changes in construction and widely different embodiments and applications of the invention will suggest themselves without departing from the spirit and scope of the invention. The disclosures and the description herein are purely illustrative and are not intended to be in any sense limiting.

I claim:

1. A blank adapted to form a polygonal box comprising a laminated sheet of material having at least one ply of substantially rigid board and an outer ply of thermoplastic resin, said sheet being scored to form a main center portion adapted to form the bottom of said container, with end-members and side-members extending from said center portion and web-corner members adjacent each corner of said center portion between adjoining end and side-members and integral therewith, each web-corner member being scored diagonally from its corner adjoining the corner of the center portion, to its outer corner, to form two sections of each web-corner, a trapezoidal segment extending from the outer edge of each section of said web-corner directly adjacent the side-members, and scoring between said trapezoidal segment and said web-corner, and a cut out portion along the outer edge of said web-corner section directly adjacent the end-members, said cutout portion having substantially the same shape and the same area as said trapezoidal segment, whereby when said blank is erected to form the box said trapezoidal segments are folded over to fit within said cutout portions with the segment surfaces covered with said outer ply of thermoplastic resin engaging the inner end-members having the same ply of thermoplastic resin.

2. A blank adapted to form a polygonal box comprising a laminated sheet of material having at least one ply of substantially rigid board and an outer ply of thermoplastic resin, said sheet being scored to form a main center-portion adapted to form the bottom of said box, with end-members and side-members extending from said center-portion and web-corner members adjacent each corner of said center-portion between adjoining end and side-members and integral therewith, each of said web-corner members lying completely within an area defined by the extension and intersection of lines coincident with the outer edges of said adjoining end and side-members and having an irregular outer edge located generally along a diagonal line extending from a point on the end-edge of an end-member and a point on the end-edge of an adjacent side-member, said points being substantially equidistant from said corner of said center-portion, said web-corner being further defined by a scoreline extending diagonally from its corner adjoining the corner of the center-portion, and terminating on said diagonal line at substantially its midpoint to form two sections of each web-corner, a tab segment extending from the outer edge of one of said sections of said web-corner and scoring between said tab segment and the adjacent section of said web-corner, and a cutout portion along the outer-edge of the other web-corner section, said cutout portion having substantially the same shape and the same area as said tab segment, whereby when said blank is set-up to form the box, said web-corner members are folded so that the non-tabbed web-corner section lies against an end-wall member and each tab is folded over to fit within said cutout portion and against the same end-wall member so that the same upper ply of thermoplastic resin seals all components of the box-corner.

3. The blank described in claim 2, wherein said tab is curved outwardly from the outer edge of each web-corner and said cutout is curved inwardly in substantially the same shape, thus forming an S-curve along the edge of each web-corner.

4. The blank described in claim 2, wherein said tabs and said cutouts are trapezoidal in shape.

5. The blank described in claim 2 wherein said tabs are triangular in shape.

6. A blank adapted to form a polygonal box comprising a sheet of foldable material coated with a layer of thermoplastic resin on its upper surface and scored to form a main center portion adapted to form the bottom of said box, wall-members extending out from all edges of said center portion, and web-corner members adjacent each corner of said center portion, connecting each pair of adjoining wall members and integral therewith, each said web-corner member being scored diagonally along a line extending from a corner adjoining a corner of said center portion, to an outer corner, to form two generally triangular-sections, one said section of each web-corner having a tab extending from its outer edge with scoring between said tab and said web-corner, the other triangular section of each said web-corner member having a cutout portion along its outer edge, said cutout portion having a shape and area into which said tab can fit when said blank is folded, said tab of each web-corner member being foldable through substantially 180° to lie within the said cutout portion and so that the upper surface of said tab on said blank will engage the upper surface of the adjoining wall-member in forming the container.

7. A tray-like container formed from a single, integral blank of uniform thickness having at least one ply of foldable cardboard and an upper ply of thermoplastic resin, said blanks being scored to form a bottom portion, side members, end members, and corner-connecting members for holding said side and end members together in an upright position substantially perpendicular to said bottom portion, each said corner-connecting member comprising: a pair of adjacent corner sections folded together and extending inwardly from a corner of the container, said corner sections being integrally attached to each other and to the end and side members, respectively; a tab member extending from the upper edge of one said corner section attached to a said side member; and a cutout portion on the upper edge of an adjacent said corner section attached to said end member, said tab being folded over 180° and lying within said cutout portion with its upper surface engaged with and heat sealed to an end member, said adjacent corner section having said cutout being also engaged with and heat sealed to an end member to form a corner connection for the container.

8. A blank adapted to form a polygonal box comprising a laminated sheet of material having at least one lower ply of substantially rigid board and an upper ply of thermoplastic resin, said sheet being scored to form a main center portion adapted to form the bottom of said container, wall members extending out from said center portion, and web-corner members adjacent each corner of said center portion being between adjoined wall-members and integral therewith, each web-corner member being scored diagonally along a line extending from a corner adjoining said corner of said center portion, to an outer corner, to define first and second generally triangular-sections, a tab extending out from the outer edge of said first triangular section of each said web-corner, and scoring between said tab and said first triangular section for bending said tab through 180°, and a cutout portion on the outer edge of each said second triangular web-corner section not having the tab, said cutout portion having substantially the same shape and the same area as said tab, and being so positioned with respect to said diagonal score and said tab that when said box is folded said tab fits within said cutout.

9. A blank adapted to form a polygonal box comprising a laminated sheet of material having an upper ply of thermoplastic resin, said laminated sheet having scoring marks to form generally two concentric rectangles with the smaller rectangle inside the larger rectangle, the scoring lines of said smaller rectangle being extended to the edge of said sheet to form elongated wall sections adjacent the ends and sides of the inner rectangle, and corner-members between each end and side-member, said corner members being scored diagonally from the corners from the inner rectangles to form two triangular sections, only one triangular section of each corner-member having a tab extending outwardly from its edge, each said triangular section not having a tab member having a portion removed therefrom of substantially the same shape and area as said tab member and being foldable back to engage and seal with an adjoining wall-member, each said tab on an adjacent triangular section being foldable through 180° to engage and seal with the same said wall-member, whereby the same ply of thermoplastic resin seals all components of the box corner.

10. The blank described in claim 9, wherein said tab comprises a trapezoidal segment along the edge of said first triangular section.

11. A blank adapted to form a polygonal box comprising a laminated sheet of material having at least one lower ply of substantially rigid board and an upper ply of thermoplastic resin, said sheet being scored to form a main center-portion adapted to form the bottom of said container, wall-members extending out from the sides and ends of said center portion, and web-corner members adjacent each corner of said center portion, being between adjoined wall means and integral therewith and lying completely within an area defined by the extension and intersection of lines coincident with the outer edges of said wall-members, said web-corner members having an irregular outer edge formed along a first diagonal line connecting substantially the outer corner of each adjoined wall-member, said web-corner being scored diagonally along a line extending from a corner adjoining said corner of said center portion, to connect with said first diagonal line to define two generally triangular sections, and a tab extending out from the outer edge of only one said triangular section of each said web-corner, and scoring between each said tab and its said adjoining triangular section, each said triangular section not having a tab member having a cutout portion along its edge of substantially the same shape and size as said tab and being foldable back to engage and seal with an adjoining wall-member, each said tab on adjacent triangular section being foldable through 180° to fit within a said cutout portion and adapted to engage and seal with the same said wall-member, whereby the same ply of thermoplastic resin seals all components of the box-corner.

References Cited in the file of this patent

UNITED STATES PATENTS

| | | |
|---|---|---|
| 415,859 | Deming | Nov. 26, 1889 |
| 1,041,659 | Moenck | Oct. 15, 1912 |
| 2,388,243 | Arneson | Nov. 6, 1945 |
| 2,419,646 | Inman | Apr. 29, 1947 |
| 2,720,903 | Pickren | Oct. 18, 1955 |
| 2,768,776 | Weiss | Oct. 30, 1956 |
| 2,808,192 | Raisin | Oct. 1, 1957 |
| 2,866,586 | Moore | Dec. 30, 1958 |
| 2,872,067 | Gessner | Feb. 3, 1959 |

FOREIGN PATENTS

| | | |
|---|---|---|
| 1,060,632 | France | Nov. 18, 1953 |